(12) United States Patent
Tommy et al.

(10) Patent No.: US 11,151,130 B2
(45) Date of Patent: Oct. 19, 2021

(54) SYSTEMS AND METHODS FOR ASSESSING QUALITY OF INPUT TEXT USING RECURRENT NEURAL NETWORKS

(71) Applicant: Tata Consultancy Services Limited, Mumbai (IN)

(72) Inventors: Robin Tommy, Trivandrum (IN); Sarath Sivaprasad, Trivandrum (IN)

(73) Assignee: Tata Consultancy Services Limited, Mumbai (IN)

( * ) Notice: Subject to any disclaimer, the term of this patent is extended or adjusted under 35 U.S.C. 154(b) by 614 days.

(21) Appl. No.: 15/793,281

(22) Filed: Oct. 25, 2017

(65) Prior Publication Data
US 2018/0225274 A1    Aug. 9, 2018

(30) Foreign Application Priority Data

Feb. 4, 2017    (IN) .............................. 201721004117

(51) Int. Cl.
*G06F 16/242*    (2019.01)
*G06F 16/245*    (2019.01)
(Continued)

(52) U.S. Cl.
CPC .......... *G06F 16/243* (2019.01); *G06F 16/245* (2019.01); *G06F 16/2433* (2019.01); *G06F 16/2448* (2019.01); *G06F 16/2454* (2019.01); *G06F 16/2455* (2019.01); *G06F 16/30* (2019.01); *G06F 16/3334* (2019.01);
(Continued)

(58) Field of Classification Search
CPC .. G06F 17/274; G06F 17/273; G06F 17/2785; G06F 17/271; G06F 17/277; G06F 16/38; G06F 16/3344; G06F 16/243; G06F 16/2433; G06F 16/2448; G06F 16/245; G06F 16/2454; G06F 16/30; G06F 16/334; G06F 16/3334; G06F 16/35; G06F 16/355; H04L 67/306; H04L 67/22
See application file for complete search history.

(56) References Cited

U.S. PATENT DOCUMENTS

7,720,675 B2    5/2010   Burstein et al.
7,835,902 B2    11/2010  Gamon et al.
(Continued)

*Primary Examiner* — Tamara T Kyle
*Assistant Examiner* — Berhanu Mitiku
(74) *Attorney, Agent, or Firm* — Finnegan, Henderson, Farabow, Garrett & Dunner, LLP (57) ABSTRACT

Systems and methods for assessing quality of input text using recurrent neural networks is disclosed. The system obtains input text from user and performs a comparison of each word from input text with words from dictionary (or trained data) to determine a closest recommended word for each word in the input text. The input text is further analyzed to determine context of each word based on at least a portion of input text, and based on determined context, at least one of correct sentences, incorrect sentences, and/or complex sentences are determined from the input text. Each word is converted to a vector based on concept(s) by comparing each word across sentences of input text to generate vectors set, and quality of the input text is assessed based on vectors set, the comparison, determined context and at least one of correct sentences, incorrect sentences, complex sentences, or combinations thereof.

6 Claims, 2 Drawing Sheets

(51) Int. Cl.
*G06F 16/30* (2019.01)
*G06F 16/93* (2019.01)
*G06F 40/30* (2020.01)
*G06F 40/232* (2020.01)
*G06F 16/33* (2019.01)
*G06F 16/2455* (2019.01)
*G06F 16/2453* (2019.01)
*G06F 16/35* (2019.01)
*G06F 16/2457* (2019.01)
*G06N 3/02* (2006.01)

(52) U.S. Cl.
CPC .............. *G06F 16/35* (2019.01); *G06F 16/93* (2019.01); *G06F 40/232* (2020.01); *G06F 40/30* (2020.01); *G06F 16/24575* (2019.01); *G06N 3/02* (2013.01)

(56) References Cited

U.S. PATENT DOCUMENTS

| | | | |
|---|---|---|---|
| 8,577,898 B2 | 11/2013 | Al Badrashiny et al. | |
| 2010/0257478 A1* | 10/2010 | Longe | G06F 3/0489 715/773 |
| 2015/0293972 A1* | 10/2015 | Lu | G06F 16/2455 707/769 |
| 2018/0046619 A1* | 2/2018 | Shi | G06F 40/47 |
| 2018/0300054 A1* | 10/2018 | Yamada | G06F 3/017 |
| 2019/0332670 A1* | 10/2019 | Zorzin | G06F 40/30 |

* cited by examiner

SYSTEMS AND METHODS FOR ASSESSING QUALITY OF INPUT TEXT USING RECURRENT NEURAL NETWORKS

PRIORITY CLAIM

This U.S. patent application claims priority under 35 U.S.C. § 119 to: India Application No. 201721004117, filed on Feb. 4, 2017. The entire contents of the aforementioned application are incorporated herein by reference.

TECHNICAL FIELD

The disclosure herein generally relate to assessment systems for input text, and, more particularly, to systems and methods for assessing quality of input text using recurrent neural networks.

BACKGROUND

With the advancement of technology, content writing has become an utmost important technique. Such tasks require capabilities and excellent skillset, and then documents containing text at times are not always found to be a consistent quality and style. This mandates review and assessment process to be followed to enable one to be a good writer or to have at least an average written skills so that the intended recipient can relate to it and easily understand the content as it is presented. Most organizations rely on third parties for review and editorial process. However, manual assessment of, and providing rating to content writing is time consuming involving lot of efforts adding to increase in costs. This further can lead to inconsistency while the content is assessed by several parties. Attempts have also been made to utilize assessment tools for determining and rating the content wherein similarities between sentences are determined and then the content is rated. This may result in incorrect assessment and may not be accurate and efficient.

SUMMARY

Embodiments of the present disclosure present technological improvements as solutions to one or more of the above-mentioned technical problems recognized by the inventors in conventional systems. For example, in one aspect, a processor implemented method for assessing quality of input text using recurrent neural networks is provided. The method comprises obtaining, via one or more hardware processors, an input text from a user, wherein the input text comprises a plurality of sentences, each sentence having a plurality of words; performing a comparison of each word from the input text with a dictionary stored in a database to determine a closest recommended word for each word in the input text; analyzing the input text to determine context of each word based on at least a portion of the input text; determining, based on the determined context, at least one of one or more correct sentences, one or more incorrect sentences, and one or more complex sentences from the input text; converting, using the determined context and at least one of the set of correct sentences and the set of incorrect sentences, and the one or more complex sentences, each word from the input text to a vector based on one or more concepts by comparing each word across the plurality of sentences of the input text to generate a set of vectors; and assessing, using one or more recurrent neural networks, quality of the input text based on at least one of the set of generated vectors, the comparison, the determined context and the at least one of the one or more correct sentences, one or more incorrect sentences and one or more complex sentences.

In an embodiment, the step of assessing quality of the input text may comprises: assigning a weightage to each of the set of generated vectors, the comparison, the determined context and the at least one of the one or more correct sentences, the one or more incorrect sentences and the one or more complex sentences; and generating a score for the input text based on the weightage. In an embodiment, a completeness score may be generated for the input text based on a topic associated with the input text.

In another aspect, a system for assessing quality of input text using recurrent neural networks is provided. The system comprises a memory storing instructions; one or more communication interfaces; and one or more hardware processors coupled to said memory using said one or more communication interfaces, wherein said one or more hardware processors are configured by said instructions to: obtain an input text from a user, wherein the input text comprises a plurality of sentences, each sentence having a plurality of words, perform a comparison of each word from the input text with a dictionary stored in a database to determine a closest recommended word for each word in the input text, analyze the input text to determine context of each word based on at least a portion of the input text, determine, based on the determined context, at least one of one or more correct sentences, one or more incorrect sentences, and one or more complex sentences from the input text, convert, using the determined context and at least one of the set of correct sentences and the set of incorrect sentences, and the one or more complex sentences, each word from the input text to a vector based on one or more concepts by comparing each word across the plurality of sentences of the input text to generate a set of vectors, and assess, using one or more recurrent neural networks, quality of the input text based on at least one of the set of generated vectors, the comparison, the determined context and the at least one of the one or more correct sentences, one or more incorrect sentences and one or more complex sentences.

In an embodiment, the one or more hardware processors are configured to assess the quality of the input text by: assigning a weightage to each of the set of generated vectors, the comparison, the determined context and the at least one of the one or more correct sentences, the one or more incorrect sentences and the one or more complex sentences; and generating a score for the input text based on the weightage. In an embodiment, the one or more hardware processors may be further configured to generate a completeness score for the input text based on a topic associated with the input text.

In yet another aspect, one or more non-transitory machine readable information storage mediums comprising one or more instructions is provided. The one or more instructions which when executed by one or more hardware processors causes obtaining an input text from a user, wherein the input text comprises a plurality of sentences, each sentence having a plurality of words; performing a comparison of each word from the input text with a dictionary stored in a database to determine a closest recommended word for each word in the input text; analyzing the input text to determine context of each word based on at least a portion of the input text; determining, based on the determined context, at least one of one or more correct sentences, one or more incorrect sentences, and one or more complex sentences from the input text; converting, using the determined context and at least one of the set of correct sentences and the set of incorrect sentences, and the one or more complex sentences, each word from the input text to a vector based on one or more concepts by comparing each word across the plurality of sentences of the input text to generate a set of vectors; and assessing, using one or more recurrent neural networks, quality of the input text based on at least one of the set of generated vectors, the comparison, the determined context and the at least one of the one or more correct sentences, one or more incorrect sentences and one or more complex sentences.

In an embodiment, the step of assessing quality of the input text may comprises: assigning a weightage to each of the set of generated vectors, the comparison, the determined context and the at least one of the one or more correct sentences, the one or more incorrect sentences and the one or more complex sentences; and generating a score for the input text based on the weightage. In an embodiment, a completeness score may be generated for the input text based on a topic associated with the input text.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Input text assessment automation typically involves manually grade every written text provided by a user. This process is cumbersome and tedious. Every parameter to be measured is evaluated in a single reading and hence the quantitative assessment may not be precise. The embodiments of the present disclosure evaluates (or assesses) an input (written) text based on its content, clarity, spelling, grammar correction and coherence of text. Since these parameters are highly subjective in nature and therefore quantitatively measuring these is an acute problem. The system cannot be trained for measuring these as the rating of these may vary or change from evaluator (or reviewer) to evaluator, making it difficult to find the pattern in the marking.

The embodiments of the present disclosure have presented experimental results wherein data has been scraped and used to train the system to develop a statistical model corresponding to a language (or languages). This enables the system of the present disclosure to be trained and assess quality of subsequent input text.

In an embodiment of the present disclosure, the system implements a spell check module that if a given non-noun word when not present in the dictionary, checks for all words with one unit distance from the given word. Word with maximum proximity is selected. If more than one word has same proximity, then the one which occurs in a given context is chosen to be closest recommended word. The system extends this technique for higher level spell checks with multiple errors. Further, the system implements a module to determine correct, incorrect and complex sentences that may have grammatical errors. For determining such sentences, the system implements one or more Application Programming Interface(s) (APIs) to cross check (or cross validate) with output that is being generated. The system further performs a coherence check which measures inter sentence and intra sentence coherence. The coherence technique is achieved by training a neural network, for example, recurrent neural network, such as but not limited to a Long Short Term Memory (LSTM) network that learns to construct a sentence by selecting every word after another. This enables the system (or the LSTM network) to predict the probability of every other word being each one in the dictionary, for a given word. Due to this, the system is able to determine or assess the lack of connection in between the words which in turn gives lack of coherence.

Figure 1:
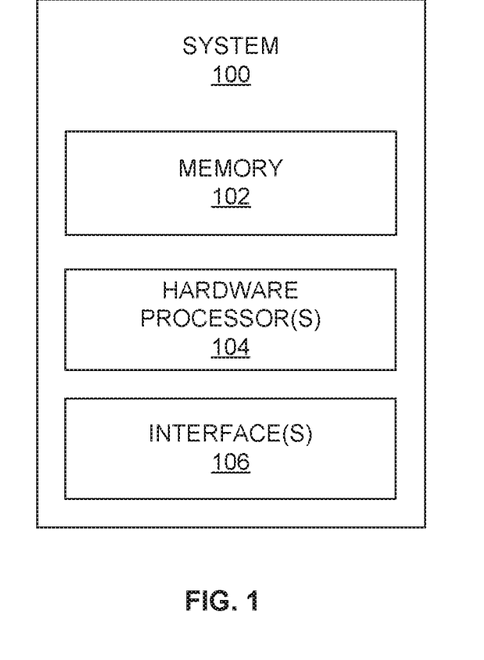
FIG. 1 illustrates an exemplary block diagram of a system for assessing input text using recurrent neural networks in accordance with an embodiment of the present disclosure.
Figure 2:
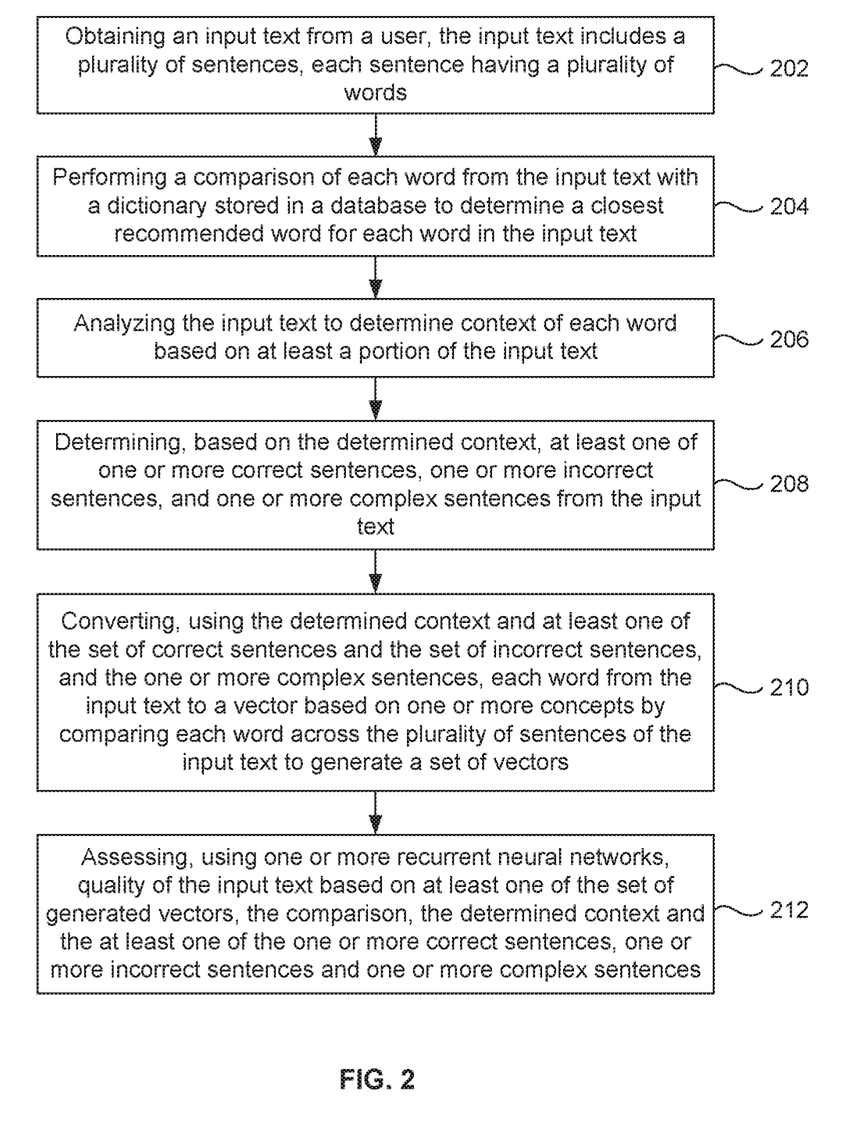
FIG. 2 illustrates an exemplary flow diagram of a method for assessing input text using recurrent neural networks implemented with the system of FIG. 1 in accordance with an embodiment of the present disclosure.

Referring now to the drawings, and more particularly to FIGS. 1 through 2, where similar reference characters denote corresponding features consistently throughout the figures, there are shown preferred embodiments and these embodiments are described in the context of the following exemplary system and/or method.

FIG. 1 illustrates an exemplary block diagram of a system 100 for assessing input text according to an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

FIG. 2, with reference to FIG. 1, illustrates an exemplary flow diagram of a method for assessing input text using the system 100 of FIG. 1 in accordance with an embodiment of the present disclosure. In an embodiment, the system 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1, and the flow diagram. In an embodiment of the present disclosure, at step 202, the one or more processors 104 obtain an input text from a user. The input text comprises a plurality of sentences, wherein each sentence may include a plurality of words. The input text may be a typed text input, or handwritten document. In case of handwritten document, the system 100 may perform an optical character recognition technique on the handwritten document and extract the input text from the same.

In an embodiment of the present disclosure, at step 204, the one or more hardware processors 104 perform a comparison of each word from the input text with a dictionary stored in a database to determine a closest recommended word for each word in the input text. In an embodiment, a spell checker may be implemented to perform spell check of the input text wherein closest recommended word(s) may be provided for a given word in the input text by way of insertion, deletion, substitution or rotation of letters in a word. In an embodiment, the dictionary may be stored in a remote system or a cloud computing environment, wherein the system 100 may query the remote system or the cloud computing environment and the comparison of each word from the input text with words from dictionary may be performed.

In an embodiment of the present disclosure, at step 206, the one or more hardware processors 104 analyze the input text to determine context of each word based on at least a portion of the input text. In an embodiment, the system 100 employs a windowing technique that is applied on one or more select portion(s) of the input text to perform context analysis and determine context of each word. For example, assuming a paragraph having text of 4 sentences. For each word in a first sentence, windowing technique may be applied on the second and third sentence to determine the context of each word in the input text (or the first sentence).

In an embodiment of the present disclosure, at step 208, the one or more hardware processors 104 determine, based on the determined context, at least one of one or more correct sentences, one or more incorrect sentences, and/or one or more complex sentences from the input text. In an embodiment, the system 100 may implement a grammar checker that uses one or more Application programming interface (APIs) to give one or more sentences with corrected grammar. The system 100 may determine a count of corrections made and penalize the user with an increase in count. Depending on the severity of error made the penalty can be changed.

In an embodiment of the present disclosure, at step 210, the one or more hardware processors 104 convert each word from the input text to a vector based on one or more concepts by comparing each word across the plurality of sentences of the input text to generate a set of vectors. The above technique of converting each word from the input text to a vector is implemented to determine coherence of words and sentences in the input text. Every word is converted into a vector using the contexts the word appeared. These vectors with 'N' dimensions may be used to train the system 100 that implements one or more recurrent neural networks (RNNs). In an embodiment of the present disclosure, the recurrent neural network comprises a Long Short Term Memory network (e.g., LSTM network).

Below is an illustrative LSTM network architecture comprising following expressions (or equations) that are used by the system 100 to learn the input text pattern and generate assessment report which determines quality of the input text:

$$f_t = \sigma_g(W_f x_t + U_f h_{t-1} + b_f)$$

$$i_t = \sigma_g(W_i x_t + U_i h_{t-1} + b_i)$$

$$o_t = \sigma_g(W_o x_t + U_o h_{t-1} + b_o)$$

$$c_t = f_t \circ c_{t-1} + i_t \circ \sigma_c(W_c x_t + U_c h_{t-1} + b_c)$$

$$h_t = o_t \circ \sigma_h(c_t)$$

Variables
$x_t$: Input vector
$h_t$: Output vector
$c_t$: Cell state vector
W, C and b: Parameter matrices and vector
$f_t$, $i_t$, and $o_t$: Gate vectors
$f_t$: Forget gate vector. Weight of remembering old information.
$i_t$: Input gate vector. Weight of acquiring new information.
$o_t$: Output gate vector. Output candidate.
$\sigma_g$: The original is a sigmoid function.
$\sigma_c$: The original is a hyperbolic tangent.
$\sigma_h$: The original is a hyperbolic tangent, but the peephole LSTM suggests $\sigma_h(x)=x$ These define the state manipulation of every neuron which has a sigmoid in it.

The sigmoid function is defined as follows:

$$\sigma(x) = 11 + e - x \sigma(x) = 11 + e - x$$

This function is easy to differentiate because:

$$\frac{d\sigma(x)}{d(x)} = \sigma(x) \cdot (1 - \sigma(x))$$

Giving a continuously differentiable unit as activation.

Distance between words: Levenshtein distance (LD) is a measure of the similarity between two strings, which is referred to as the source string (s) and the target string (t) in the present disclosure. The distance is the number of deletions, insertions, or substitutions required to transform 's' into 't'. mathematically, the Levenshtein distance between two strings is given by way of illustrative expression below:

$$lev_{a,b}(i, j) = \begin{cases} \max(i, j) & \text{if}(i, j) = 0, \\ \min \begin{cases} lev_{a,b}(i-1, j) + 1 \\ lev_{a,b}(i, j-1) + 1 \\ lev_{a,b}(i-1, j-1) + 1_{(a_i \neq b_j)} \end{cases} & \text{otherwise.} \end{cases}$$

This combines with the normal Euclidean distance wise clustering distance $((x, y), (a, b)) = \sqrt{(x-a)^2 + (y-b)^2}$, where x and y are coordinates, and the ordered pair (a, b) is reference point.

Where $1_{(a_j \neq b_j)}$ is the indicator function equal to 0 when $a_j = b_j$ and equal to 1 otherwise, and $lev_{a,b}(i,j)$ is the distance between the first i characters of a and the first j characters of b.

It may be noted that the first element in the minimum may correspond to deletion (from a to b), the second to insertion and the third to match or mismatch, depending on whether the respective symbols are the same.

Referring back to step 210, in an embodiment, each word is converted to a vector by using (or based on) the determined context and at least one of the set of correct sentences and the set of incorrect sentences, and the one or more complex sentences.

In an embodiment of the present disclosure, at step 212, the one or more hardware processors 104 assessing, using one or more recurrent neural networks, quality of the input text based on at least one of the set of generated vectors, output resulted (or extracted or derived) from the comparison between each word and the words from dictionary, the determined context and the at least one of the one or more correct sentences, one or more incorrect sentences and one or more complex sentences, or combinations thereof. In an embodiment, the quality of the input text may be assessed by assigning a weightage to each of the set of generated vectors, the output resulted from the comparison between each word and the words from dictionary, the determined context and the at least one of the one or more correct sentences, the one or more incorrect sentences and the one or more complex sentences and a score for the input text is generated based on the weightage which is indicative (or characterize) the quality of the input text. In an embodiment, based on the topic associated with the input text, the system 100 may generate a completeness score for the input text. The quality assessment made by the system 100 may be provided as a continuous feedback to the system 100 so as to learn from the pattern of the steps carried out and provide near accurate quality assessments for subsequent input texts.

Experimental Results

Below is an illustrative example of the input text comprising a plurality of sentences as obtained from a user:
"My name was John Doe. I am fascinated by image and language comprehension in intelligent networks. I aspire to understood the functioning of evolving networks and in the process figure in the very nature of intelligence and its manifestation in beings. Birds are beautiful"
Assuming the following:
S1: My name was John Doe
S2: I am fascinated by image and language comprehension in intelligent networks
S3: I aspire to understood the functioning of evolving networks and in the process figure in the very nature of intelligence and its manifestation in beings
S4: Birds are beautiful As a next step, the recurrent neural networks based system 100 performs a comparison of each word from each sentence of the input text with words from a dictionary stored in a database to determine a closest recommended word for each word in the input text. For example, each word (e.g., 'My', 'name' 'was', and 'John Doe' from S1 is compared with words from dictionary to determine closest recommended word. In the above sentence S1 "My name was John Doe", upon performing comparison the system 100 has determined that the closest recommended word for 'My' is 'My', 'name', is 'name' and 'was' is 'is'. For words, such as for example, name 'John Doe', the system 100 may suggest a different word based on the level of training (or knowledge), and training data present in the database, or may simply retain or suggest the same name.

The system 100 may then provide sentences with corrected errors as illustrated by way of example below:
S1: My name was John Doe.
S2: I am fascinated by image and language comprehension in intelligent networks.
S3: I aspire to understood the functioning of evolving networks and in the process figure in the very nature of intelligence and its manifestation in beings.
S4: Birds are beautiful.

Based on the number of closest recommended word(s) determined, the system 100 assigns a weightage to each of the sentences and generates a score (e.g., an error correction score, say '6') based on the weightage.

Upon comparing each word of the sentences S1, S2, S3, and S4 to words from dictionary, and identifying (or determining) the closest recommended word(s), the system 100 analyzes each of the sentences S1, S2, S3, and S4 to determine context of each word based on at least a portion of the input text. The system 100 further determines, based on the determined context, at least one of one or more correct sentences, one or more incorrect sentences, and one or more complex sentences from the input text.

The sentences may be provided by the system as follows by way of examples:
S1: My name is John Doe.
S2: I am fascinated by image and language comprehension in intelligent networks.
S3: I aspire to understand the functioning of evolving networks and in the process figure out the very nature of intelligence and its manifestation in beings.
S4: Birds are beautiful.

Based on the determined context (and/or the determined closest recommended words), and the determined correct sentences, incorrect sentences, and/or complex sentences, the system 100 assigns a weightage (e.g., context weightage and sentence type score) for the sentences and generates a score (e.g., context analysis and sentence type score, say '2') based on the weightage. In an embodiment, the expression 'sentence type' refers to type of sentences such as for example, correct sentence(s), incorrect sentence(s), and/or complex sentence(s).

Further, the system 100 converts, each word from each of the sentences within the input text to a vector based on one or more concepts by comparing each word across the plurality of sentences of the input text to generate a set of vectors. In other words, the system 100 generates a 'N' dimensional vector representation for each word based on the concepts and by comparing each word with words within the same sentence (e.g., intra sentence) and remaining sentences (inter sentence). Below is an illustrative example of word to vector conversion of the input text:
My=[123, 324, 3124, 123, 1423, 2347, 2615, 234, 5]
name=[743, 393, 808, 273, 394, 253, 1071, 738, 1100, 41]
was =[345, 5678, 924, 407, 571, 101, 35, 1117, 1008, 89]
John Doe=[0, 0, 0, 0, 0, 0, 0, 0, 0, 0]
.=[1281, 1793, 1357, 905, 1256, 1923, 1659, 1820, 1309, 1227]

I=[567, 654, 297, 379, 654, 269, 907, 645, 340, 897]
am=[924, 82, 749, 572, 647, 893, 745, 62, 284, 90]
fascnated=[0, 0, 0, 0, 0, 0, 0, 0, 0, 0]
by=[93, 482, 704, 842, 98, 476, 993, 782, 287, 78]
image=[945, 29, 490, 598, 1238, 839, 495, 783, 947, 56]
and =[937, 738, 745, 832, 291, 182, 345, 596, 822, 93]
language=[345, 287, 466, 728, 394, 563, 237, 288, 739, 84]
comprehension=[231, 546, 657, 282, 790, 169, 858, 361, 946, 32]
in =[934, 893, 929, 948, 392, 839, 499, 818, 968, 795, 86]
intelligent=[299, 365, 345, 354, 387, 267, 162, 398, 36, 76]
networks=[0, 0, 0, 0, 0, 0, 0, 0, 0, 0]
.=[1281, 1793, 1357, 905, 1256, 1923, 1659, 1820, 1309, 1227]
I=[567, 654, 297, 379, 654, 269, 907, 645, 340, 897]
aspire=[809, 348, 769, 583, 759, 837, 289, 765, 297, 102]
to =[867, 893, 479, 687, 256, 748, 608, 93, 223, 45]
understood=[739, 587, 329, 754, 897, 215, 703, 759, 287, 81]
the =[901, 968, 948, 209, 840, 847, 972, 974, 1342, 31]
functioning=[385, 971, 757, 890, 479, 375, 297, 242, 832, 35]
of =[893, 748, 957, 298, 759, 723, 425, 443, 809, 84]
evolving=[764, 712, 682, 571, 369, 578, 710, 932, 543, 49]
networks=[0, 0, 0, 0, 0, 0, 0, 0, 0, 0]
and =[937, 738, 745, 832, 291, 182, 345, 596, 822, 93]
in =[934, 893, 929, 948, 392, 839, 499, 818, 968, 795, 86]
the =[901, 968, 948, 209, 840, 847, 972, 974, 1342, 31]
process=[849, 672, 887, 698, 527, 648, 237, 877, 234, 245]
figure=[319, 756, 173, 469, 198, 659, 164, 356, 485, 25]
in =[934, 893, 929, 948, 392, 839, 499, 818, 968, 795, 86]
the =[901, 968, 948, 209, 840, 847, 972, 974, 1342, 31]
very=[758, 699, 279, 347, 687, 426, 847, 236, 747, 127]
nature=[395, 690, 274, 869, 524, 677, 420, 709, 236, 92]
of =[893, 748, 957, 298, 759, 723, 425, 443, 809, 84]
intelligence=[219, 262, 378, 248, 728, 781, 837, 192, 421, 86]
and=[937, 738, 745, 832, 291, 182, 345, 596, 822, 93]
its=[739, 869, 214, 796, 797, 893, 529, 767, 924, 860, 132]
manifestation=[0, 0, 0, 0, 0, 0, 0, 0, 0, 0]
in =[934, 893, 929, 948, 392, 839, 499, 818, 968, 795, 86]
beings=[831, 765, 730, 761, 37, 560, 815, 847, 826, 50]
.=[1281, 1793, 1357, 905, 1256, 1923, 1659, 1820, 1309, 1227]
Birds=[269, 874, 897, 647, 684, 723, 682, 908, 682, 176]
are=[185, 408, 973, 897, 159, 871, 987, 571, 956, 173]
beautiful=[588, 391, 759, 871, 975, 971, 978, 289, 572, 184]
.=[1281, 1793, 1357, 905, 1256, 1923, 1659, 1820, 1309, 1227]

As can be seen from the above vector sets for the input text, for every incorrect word, the values of that vector are generated as '0' by the system 100. In other words, for every incorrect word (e.g., fascinated, networks, etc.) the system 100 generates a null vector. Further, the above values in each vector set depict indicate that a particular word has appeared for that many times in a particular category (which is referred to as a concept (or data chunk). The category (or concept or data chunk) may be stored in the database residing in the memory 102 and could be referred as trained data. For example, the word 'beautiful' from the sentence 'S4' has appeared 184 times in a concept called 'Nature'. Similarly, the word or expression 'Bird' from the sentence 'S4' has appeared 176 times in the concept 'Nature'. Further, it is seen that the word 'functioning' from the sentence 'S3' has appeared 35 times in the concept 'Nature'.

Based on the generated vector representation of words, the system 100 may assign a weightage (word to vector conversion weightage), and generate a score (e.g., a vector score, say 0.21) for the vector representation.

The system 100 may further provide its feedback with respect to the input text received from the user. Illustrated below is an example of the generated correct text by the system 100:

"My name is John Doe. I am fascinated by image and language comprehension in intelligent networks. I aspire to understand the functioning of evolving networks and in the process figure out the very nature of intelligence and its manifestation in beings. Birds are beautiful."

The above generated correct text may also be displayed in the form of corrected sentences (CS) as illustrated by way of example below:

CS1: My name is John Doe.
CS2: I am fascinated by image and language comprehension in intelligent networks.
CS3: I aspire to understand the functioning of evolving networks and in the process figure out the very nature of intelligence and its manifestation in beings.
CS4: Birds are beautiful.

Similarly, the system 100 generates a vector representation for the system generated text (corrected sentences—CS1, CS2, CS3 and CS4). The system 100 further assesses, using one or more recurrent neural networks, quality of the input text based on at least one of the set of generated vectors (vectors of the input text received from the user), the comparison, the determined context and the at least one of the one or more correct sentences, one or more incorrect sentences and one or more complex sentences. In other words, the system 100 assesses the quality of the input text based on the weightages assigned to output generated from steps being performed on the input text, and corresponding score being generated using the weightages (e.g., positive weightage, negative weightage, etc.).

The system 100 performs a comparison of the generated corrected text (or generated and recommended text) and the input text received from the user. Alternatively, the system 100 performs a comparison of the vectors sets of the generated corrected text (or generated and recommended text—CS1, CS2, CS3, and CS4) and vectors sets of input text (sentence S1, S2, S3 and S4). Based on the comparison, the input text is assessed by providing a score (e.g., assessment score, say 0.47). As it can be seen that a score of 0.47 is provided to the input text depicting the quality. It is to be further noted that this score of 0.47 is due to the low coherence in the last sentence 'S4' which is out of the context when compared to other sentences S1, S2 and S3. Alternatively, the embodiments of the present disclosure may enable the system 100 to provide a completeness score to the input text based on the topic associated with the input text. In an example embodiment, the completeness score may be indicative of how much (portion or percentage) of the input text is complete and can be easily understood (by readers or systems).

The embodiments of the present disclosure provide systems and methods that implement one or more recurrent neural networks (e.g., LSTM network(s)) for assessing quality of input text. Unlike traditional assessment tools that are mainly focused on auto correcting, the proposed system 100 determines coherence and contextual content of the input text. Further, unlike conventional assessment tools that evaluate and rate the content (e.g., essay) based on the grammatical and syntactical correctness, the proposed system 100 takes into account (or consideration) the content mapping and coherence weightage. The proposed system 100 assesses the input text based on plurality of parameters, for example, error correction, coherence (comparison of each word within the same sentence and across sentences), clarity and correctness, and intelligent generates and assigns a weightage to each of these parameters, and generates a score for the input text that indicates quality of the input text.

The system 100 is implemented with a neural network (e.g., recurrent neural network) that learns the structure and use of words in the language (e.g., English as described above). The language character learning may happen (or happens) based on the (large) dataset training. The system 100 may then predict probability of next word, being a particular entry in the dictionary, given the previous word set in a particular sentence. This prediction technique that is used to determine successive words based on preceded words (or context) is used to rate (or provide weightage and/or score) to the coherence of following word(s) in sentence(s) of the input text. When a word is identified as an incorrect word, the system 100 performs error correction (e.g., spell and grammar check) by mapping to the nearest or closest correct word, thus making itself aware of the content or the input text. Unlike traditional assessment tools which learn from annotated corpus, the proposed system 100 learns from the written input text received from the user which makes training easier (wherein any amount of data may be scraped for the same).

Although the embodiments of the present disclosure and the system 100 perform the above proposed methodology for English language using a LSTM network, it should be understood to person skilled (or having ordinary skill) in the art, that the embodiments of the present disclosure may be implemented for other language input text, for example, Hindi, German, etc. using any of the neural network(s), and should not be construed as limiting the scope of the embodiments herein.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, BLU-RAYs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
obtaining, via one or more hardware processors, an input text from a user, wherein the input text comprises a plurality of sentences, each sentence having a plurality of words, wherein the input text is obtained from a typed text, or a handwritten document, and wherein the input text from the handwritten document is obtained by applying an optical character recognition technique on the handwritten document;

performing a comparison of each word from the input text with a dictionary stored in a database to determine a closest recommended word for each word in the input text;

analyzing the input text to determine context of each word based on at least a portion of the input text, using a windowing technique;

determining, based on the determined context, at least one of one or more correct sentences, one or more incorrect sentences, and one or more complex sentences from the input text;

converting, using the determined context and at least one of the set of correct sentences and the set of incorrect sentences, and the one or more complex sentences, each word from the input text to an N-dimensional vector based on one or more concepts by comparing each word across the plurality of sentences of the input text to generate a set of vectors, wherein each word is compared across the plurality of sentences of the input text to measure inter sentence and intra sentence coherence within the input text, and wherein the N-dimensional vector is assigned a null value for every incorrect word appearing in the input text; and assessing, using one or more Long Short Term Memory (LSTM) recurrent neural networks, quality of the input text based on at least one of the set of generated vectors, the comparison, the determined context and the at least one of the one or more correct sentences, one or more incorrect sentences and one or more complex sentences, wherein the assessed quality of the input text is provided as a continuous feedback to the one or more LSTM recurrent neural networks to learn continuously and improve assessment of subsequent input texts, and wherein assessing the quality of the input text comprises:

assigning a weightage to each of the set of generated vectors, the comparison, the determined context and the at least one of the one or more correct sentences, the one or more incorrect sentences and the one or more complex sentences; and generating a score for the input text based on the weightage.

2. The processor implemented method of claim 1, further comprising generating a completeness score for the input text based on a topic associated with the input text.

3. A system comprising:

a memory storing instructions;

one or more communication interfaces; and one or more hardware processors coupled to said memory using said one or more communication interfaces, wherein said one or more hardware processors are configured by said instructions to:

obtain an input text from a user, wherein the input text comprises a plurality of sentences, each sentence having a plurality of words, wherein the input text is obtained from a typed text, or a handwritten document, and wherein the input text from the handwritten document is obtained by applying an optical character recognition technique on the handwritten document, perform a comparison of each word from the input text with a dictionary stored in a database to determine a closest recommended word for each word in the input text, analyze the input text to determine context of each word based on at least a portion of the input text, using a windowing technique, determine, based on the determined context, at least one of one or more correct sentences, one or more incorrect sentences, and one or more complex sentences from the input text, convert, using the determined context and at least one of the set of correct sentences and the set of incorrect sentences, and the one or more complex sentences, each word from the input text to an N-dimensional vector based on one or more concepts by comparing each word across the plurality of sentences of the input text to generate a set of vectors, wherein each word is compared across the plurality of sentences of the input text to measure inter sentence and intra sentence coherence within the input text, and wherein the N-dimensional vector is assigned a null value for every incorrect word appearing in the input text, and assess, using one or more Long Short Term Memory (LSTM) recurrent neural networks, quality of the input text based on at least one of the set of generated vectors, the comparison, the determined context and the at least one of the one or more correct sentences, one or more incorrect sentences and one or more complex sentences, wherein the assessed quality of the input text is provided as a continuous feedback to the one or more LSTM recurrent neural networks to learn continuously and improve assessment of subsequent input texts, and wherein the quality of the input text is assessed by:

assigning a weightage to each of the set of generated vectors, the comparison, the determined context and the at least one of the one or more correct sentences, the one or more incorrect sentences and the one or more complex sentences; and generating a score for the input text based on the weightage.

4. The system of claim 3, wherein the one or more hardware processors are further configured to generate a completeness score for the input text based on a topic associated with the input text.

5. One or more non-transitory machine readable information storage mediums comprising one or more instructions which when executed by one or more hardware processors causes:

obtaining, via the one or more hardware processors, an input text from a user, wherein the input text comprises a plurality of sentences, each sentence having a plurality of words, wherein the input text is obtained from a typed text, or a handwritten document, and wherein the input text from the handwritten document is obtained by applying an optical character recognition technique on the handwritten document;

performing a comparison of each word from the input text with a dictionary stored in a database to determine a closest recommended word for each word in the input text;

analyzing the input text to determine context of each word based on at least a portion of the input text, using a windowing technique;

determining, based on the determined context, at least one of one or more correct sentences, one or more incorrect sentences, and one or more complex sentences from the input text;

converting, using the determined context and at least one of the set of correct sentences and the set of incorrect sentences, and the one or more complex sentences, each word from the input text to an N-dimensional vector based on one or more concepts by comparing each word across the plurality of sentences of the input text to generate a set of vectors, wherein each word is compared across the plurality of sentences of the input text to measure inter sentence and intra sentence coherence within the input text, and wherein the N-dimensional vector is assigned a null value for every incorrect word appearing in the input text; and assessing, using one or more Long Short Term Memory (LSTM) recurrent neural networks, quality of the input text based on at least one of the set of generated vectors, the comparison, the determined context and the at least one of the one or more correct sentences, one or more incorrect sentences and one or more complex sentences, wherein the assessed quality of the input text is provided as a continuous feedback to the one or more LSTM recurrent neural networks to learn continuously and improve assessment of subsequent input texts, and wherein assessing the quality of the input text comprises:

assigning a weightage to each of the set of generated vectors, the comparison, the determined context and the at least one of the one or more correct sentences, the one or more incorrect sentences and the one or more complex sentences; and generating a score for the input text based on the weightage.

6. The one or more non-transitory machine readable information storage mediums of claim 5, further comprising generating a completeness score for the input text based on a topic associated with the input text.

* * * * *